United States Patent
Fleischhacker

(10) Patent No.: US 7,778,210 B2
(45) Date of Patent: *Aug. 17, 2010

(54) BRIDGE CIRCUIT TO SUPPRESS ECHOES IN COMMUNICATION DEVICES

(75) Inventor: Christian Fleischhacker, Pischeldorf (AT)

(73) Assignee: Infineon Technologies, AG, Munich (DE)

( * ) Notice: Subject to any disclaimer, the term of this patent is extended or adjusted under 35 U.S.C. 154(b) by 15 days.

This patent is subject to a terminal disclaimer.

(21) Appl. No.: 12/020,513

(22) Filed: Jan. 25, 2008

(65) Prior Publication Data

US 2008/0117840 A1 May 22, 2008

Related U.S. Application Data

(63) Continuation of application No. 10/680,709, filed on Oct. 7, 2003, now Pat. No. 7,324,467.

(30) Foreign Application Priority Data

Oct. 10, 2002 (DE) ................. 102 47 208

(51) Int. Cl.
*H04B 3/20* (2006.01)
(52) U.S. Cl. ............. 370/286; 370/285; 375/346; 379/406.08; 379/406.02; 455/63.1
(58) Field of Classification Search ............ 194/317; 324/673; 370/281, 286, 406.02, 285; 379/242, 379/339, 398, 404, 406.06, 406.08, 406.02; 381/108; 455/155.1, 63.1; 704/225; 73/204.15; 307/10.1, 117; 327/100, 337; 380/59; 368/202; 375/346
See application file for complete search history.

(56) References Cited

U.S. PATENT DOCUMENTS

| | | | | |
|---|---|---|---|---|
| 4,074,086 A | * | 2/1978 | Falconer et al. | 379/406.08 |
| 4,087,654 A | * | 5/1978 | Mueller | 379/406.08 |
| 4,267,599 A | * | 5/1981 | Vissers | 455/115.1 |
| 4,272,648 A | * | 6/1981 | Agrawal et al. | 381/108 |
| 4,465,379 A | * | 8/1984 | Misawa et al. | 368/202 |
| 4,476,557 A | * | 10/1984 | Knoedl, Jr. | 370/285 |
| 4,574,200 A | * | 3/1986 | Racca et al. | 307/117 |
| 4,611,342 A | * | 9/1986 | Miller et al. | 704/225 |
| 4,652,703 A | * | 3/1987 | Lu et al. | 379/339 |

(Continued)

FOREIGN PATENT DOCUMENTS

| | | |
|---|---|---|
| DE | 1 281 562 | 10/1968 |
| DE | 199 61 500 | 12/1999 |
| EP | 1 107 464 | 6/2001 |

OTHER PUBLICATIONS

Heidelberg, Grundlagen der Elektrotechnik, 8th ed., 1988, pp. 249-250, VEB Verlag Technik, Berlin, German Democratic Republic (English translation attached).

Junge, Lexikon Elektronik, pg. 821, 1994, VCH Verlagsgesellschaft mbH, Weinheim, Federal Republic of Germany (English translation attached).

*Primary Examiner*—Gerald Gauthier
(74) *Attorney, Agent, or Firm*—Holme Roberts & Owen LLP

(57) ABSTRACT

Bridge circuit for echo suppression for a reception signal of a communication device connected to a transmission line, to which can be supplied a reception signal received via the transmission line and a transmission signal to be transmitted by the communication device via the transmission line. The bridge circuit is designed such that on balancing the bridge circuit, the reception signal there can be tapped echo-compensated with a transmission signal part generated by the transmission signal being suppressed. To balance the bridge circuit a variable simulation device is provided to simulate at least one circuit section of at least one bridge branch and connect with the at least one bridge branch. By such an arrangement, the signal level in the simulation device may be reduced so far that this can be designed as an integrated circuit and to be programmable.

24 Claims, 3 Drawing Sheets

U.S. PATENT DOCUMENTS

| | | | | |
|---|---|---|---|---|
| 4,670,870 A * | 6/1987 | Hewinson et al. | ............ | 370/285 |
| 4,754,224 A * | 6/1988 | Maschek et al. | ............ | 327/100 |
| 4,787,080 A * | 11/1988 | Yamakido et al. | ........... | 370/286 |
| 4,796,296 A * | 1/1989 | Amada et al. | .......... | 379/406.06 |
| 4,987,316 A * | 1/1991 | White et al. | ............... | 307/10.1 |
| 5,048,662 A * | 9/1991 | Yamashita et al. | .......... | 194/317 |
| 5,109,533 A * | 4/1992 | Mine et al. | ................. | 455/63.1 |
| 5,287,406 A * | 2/1994 | Kakuishi | .................... | 379/404 |
| 5,414,763 A * | 5/1995 | Hirata | ........................ | 379/242 |
| 5,856,970 A * | 1/1999 | Gee et al. | ................... | 370/286 |
| 5,893,034 A | 4/1999 | Hikuma et al. | | |
| 5,943,392 A * | 8/1999 | Olson | ............................ | 379/3 |
| 6,181,192 B1 | 1/2000 | Whittrock | | |
| 6,072,382 A * | 6/2000 | Daughton et al. | ......... | 338/32 R |
| 6,111,861 A * | 8/2000 | Burgess | ....................... | 370/286 |
| 6,386,030 B1 * | 5/2002 | Liedtke et al. | ........... | 73/204.15 |
| 6,400,822 B1 * | 6/2002 | Anozie | ....................... | 379/398 |
| 6,590,401 B1 * | 7/2003 | Hildebrandt | ................ | 324/673 |
| 6,741,124 B2 * | 5/2004 | Lucas | ........................... | 330/59 |
| 6,965,657 B1 * | 11/2005 | Rezvani et al. | .............. | 375/346 |
| 7,039,020 B1 * | 5/2006 | Bahlenberg et al. | ........ | 370/281 |
| 7,324,467 B2 * | 1/2008 | Fleischhacker | ............. | 370/286 |
| 7,492,840 B2 * | 2/2009 | Chan | .......................... | 375/346 |
| 2002/0101982 A1* | 8/2002 | Elabd | ....................... | 379/406.01 |
| 2004/0160263 A1* | 8/2004 | Gupta | ........................ | 327/337 |
| 2008/0117840 A1* | 5/2008 | Fleischhacker | ............. | 370/286 |

* cited by examiner

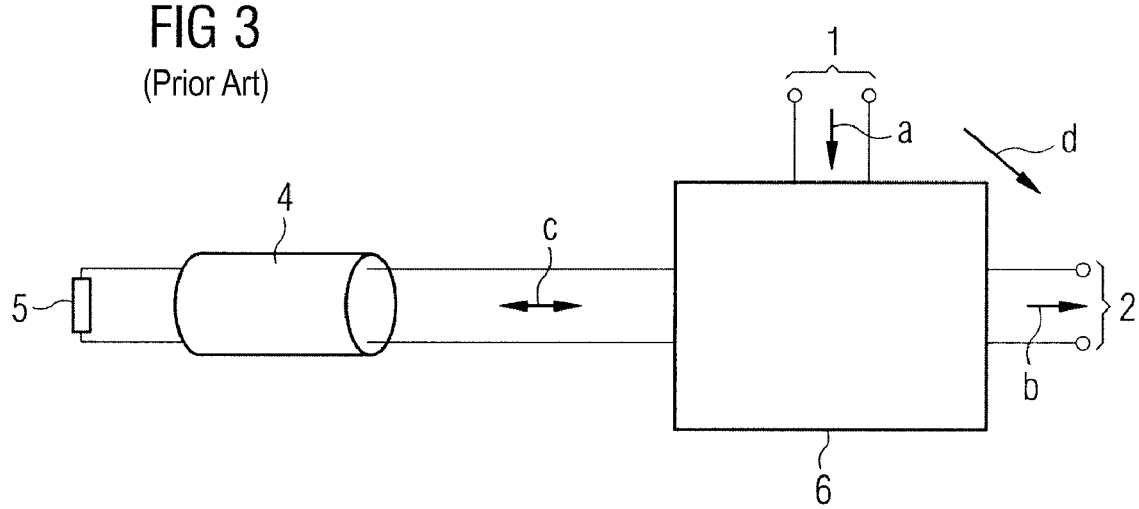
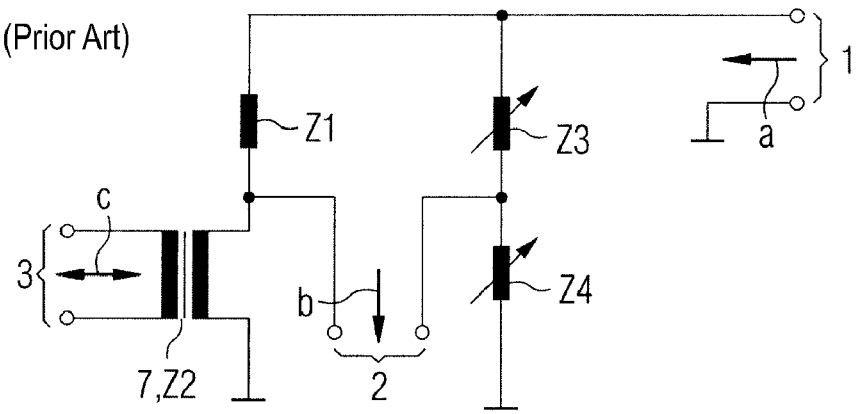

BRIDGE CIRCUIT TO SUPPRESS ECHOES IN COMMUNICATION DEVICES

This application is a continuation of U.S. patent application Ser. No. 10/680,709, filed on Oct. 7, 2003, entitled "Bridge Circuit To Suppress Echoes In Communication Devices," which claims priority to and the benefit of German Patent Application No. 102 47 208.4, filed on Oct. 10, 2002, and entitled "Bridge Circuit To Suppress Echoes In Communication Devices," both of which are incorporated herein by reference in their entireties.

BACKGROUND OF THE INVENTION

1. Field of the Invention

The present invention relates to circuits for communication devices. More particularly, the invention relates to a bridge circuit to suppress or damp echoes in communication devices.

2. Background Technology

In duplex mode, with a two-wire line, signals are transmitted simultaneously in both directions from and to a communication device, for example an xDSL modem. In order to be processed further, the incoming and outgoing signals must, however, be separated at both line ends into their respective transmission directions. Conversion therefore takes place from two-wire transmission to four-wire transmission and vice versa, performed by a hybrid circuit, for example.

FIG. 3 shows diagrammatically such an arrangement. Transmission and reception signals c are transmitted together on a two-wire line 4 from and to a remote end 5 of the line 4. At the near end of the line a hybrid circuit 6 performs the conversion from two-wire transmission to four-wire transmission. The transmission signal a is supplied to the hybrid circuit 6 at a connection 1 for a transmitter device, and the reception signal b is tapped or picked up at a connection 2 for a receiver device.

The problem arises here that the transmission signal a is reflected as an echo d into the reception signal b. Depending on the line type, the signal power of this echo can far exceed that of the reception signal. Hybrid circuits and/or filter solutions are designed to suppress this echo as far as possible.

A known possibility for echo suppression is the use of passive or active filters. This type of echo suppression has the advantage that the filters can be dimensioned independently of the transmission line. Depending on the transmission system used, these filters may, however, be very complex and hence cost-intensive. A further disadvantage of filter solutions is that the filters must be adapted accordingly for transmission and reception frequency bands that differ by system, which e.g., is possible only to a limited extent for integrated solutions.

Another solution approach is intended to simulate the echo path and cancel the echo with a signal obtained by simulation. This approach is generally known as Echo Cancellation. Examples of this are so-called balancing filters or 2nd DAC (digital-analog converter) solutions. The advantage of this method is the great z independence of the frequency bands used.

Both solutions can be designed to be relatively easily programmable, but are critical elements in the overall system in view of their linearity and noise contribution. The reason is that the echo suppression takes place first at the corresponding receiver or semiconductor module. After this suppression a great amplification is required to utilize the maximum signal level of the analog-digital converter (ADC) present in the reception signal path of such circuits.

Another possibility for echo cancellation is resistive or complex termination sets or bridge circuits. These circuits are dimensioned so that they simulate as well as possible a particular area of line types. Because of the various possible line properties it is necessary to make compromises in dimensioning and thus not obtain good echo suppression for every line type.

FIG. 4 shows the principle structure of a simple hybrid in the form of a bridge circuit. A combined transmission and reception signal c is transmitted via a transmitter 7 to the bridge circuit. The transmission signal a is supplied via a connection 1 to a transmission device, and the reception signal b is tapped via a connection 2 for a receiver device. An impedance Z1 can represent, for example, loads of a communication device comprising the bridge circuit, and an impedance Z2 can correspond to a winding in the transmitter 7 and serves to take into account the line impedance of the corresponding transmission distance or line. Impedances Z1 and Z2 are components of a first bridge branch of the bridge circuit. A second bridge branch formed from impedances Z3 and Z4 serves to simulate the path formed by Z1 and Z2 and thus balance the bridge circuit. The echo is minimized if equation 1

$$\frac{Z1}{Z2} = \frac{Z3}{Z4} \tag{1}$$

is fulfilled. The transmission function of the transmission signal on the line is not influenced by the adjustment and is not considered further here.

In these circuits the problem arises that such a circuit cannot be implemented in an integrated circuit as the signal level in the second bridge branch is generally very high, although the signal power only amounts to a fraction of the transmission power as the second bridge branch is generally designed to have a high impedance.

SUMMARY OF THE INVENTION

The present invention is directed to a hybrid circuit, present in the form of a bridge circuit, which is programmable in a particular range and implementable at least partly in the form of an integrated circuit. This invention features are achieved by a bridge circuit having the features described herein.

According to the invention, to balance the bridge circuit a variable simulation device is provided to simulate at least one bridge branch or at least one bridge branch of circuit sections. The bridge circuit is thus not balanced or not balanced only by a change in impedances in one of the bridge branches of the bridge circuit, but by adapting the simulation device or the simulated bridge branches or circuit sections of the bridge circuit implemented thereby.

This simulation device in particular can be designed and connected with at least one bridge branch so that a lower signal level is present therein than in the at least one bridge branch. Thus, the simulation device can be designed to be programmable and in the form of an integrated circuit.

The simulation device, generally of higher impedance than the simulated bridge branch or simulated circuit section, can be connected in parallel to an impedance present in the at least one bridge branch. The bridge circuit generally also comprises impedances which are formed by a winding of a transmitter coupled with the relevant transmission line, a line impedance of the transmission section, or by loads present in a communication device comprising the bridge circuit.

The invention is suitable preferably for use in an xDSL transmission system, for example VDSL or ADSL transmission systems, without however being restricted to this preferred area of application.

These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention is explained in more detail below with reference to the enclosed drawings, wherein:

FIG. 3 shows a diagrammatic view of a 2-wire/4-wire conversion; and

FIG. 4 shows a bridge circuit according to the state of the art.

DETAILED DESCRIPTION OF THE INVENTION

Figure 1:
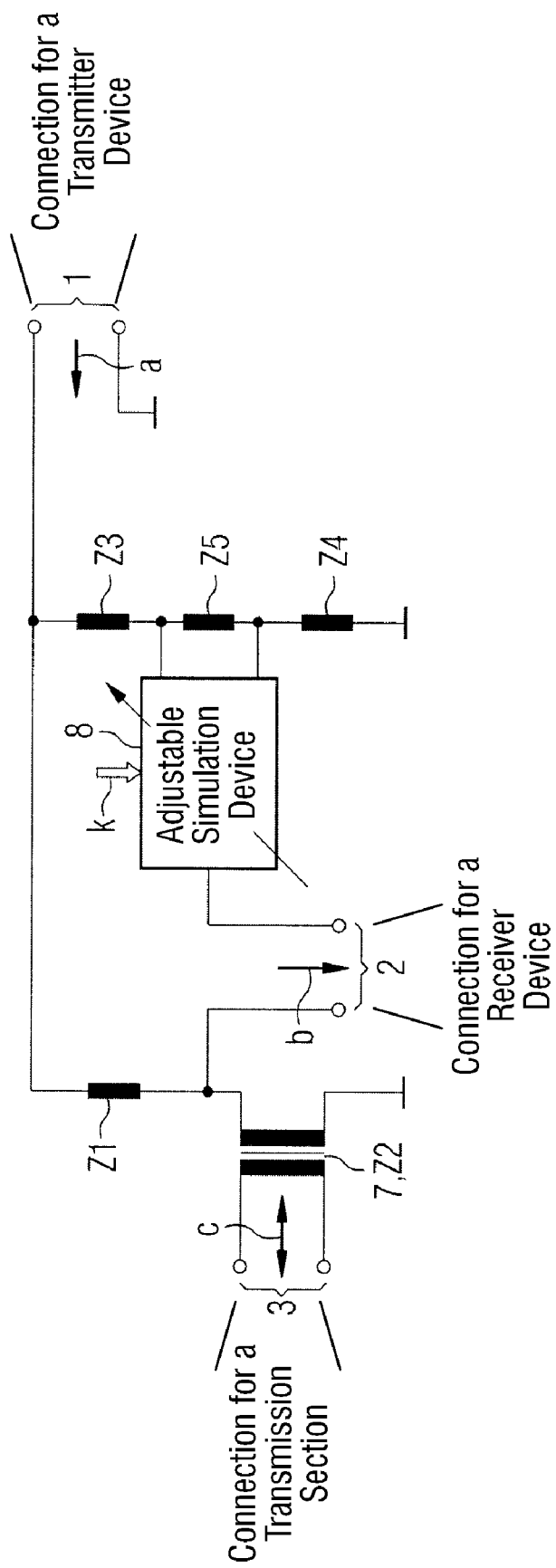
FIG. 1 shows one embodiment of a bridge circuit according to the invention.

In the bridge circuit according to the invention shown in FIG. 1, a combined transmission and reception signal c is coupled with a bridge circuit via a connection 3 for a transmission section and a transmitter 7. Supplied to this bridge circuit via a connection 1 is a transmission signal a for a transmitter device, and at a connection 2 reception signal b is tapped for a receiver device.

The bridge circuit includes a first bridge branch, formed by impedance Z1, which for example represents loads of a communication device comprising the bridge circuit or serves for power adaptation, and an impedance Z2 that shows the impedance of the transmission line and in the embodiment shown is implemented by a winding of the transmitter 7, and a second bridge branch. This second bridge branch includes impedances Z3, Z4, and Z5. A variable or adjustable simulation device 8 is connected in parallel to the impedance Z5. One pole of the connection 2 for the receiver device is tapped at the simulation device 8, and another pole of the connection 2 is tapped between the impedances Z1 and Z2. The simulation device which simulates impedance Z5, as shown by balancing parameter k, can be modified so that the echo is minimized. This is the case if equation $$\frac{Z1}{Z2} = \frac{Z3 + k \cdot Z5}{Z4 + (1-k) \cdot Z5} \quad (2)$$

is fulfilled, where k lies in the closed interval of 0 to 1. The balancing parameter k can be determined via a suitable algorithm, which for example can use as an input a measurement of the echo signal level.

By introducing impedance Z5, in comparison with the state of the art explained above and shown in FIG. 4, a reduction in the signal level is achieved in the simulation device 8. With this type of bridge circuit it is now possible to design the simulation device with such high impedance that a programmable impedance array can also be implemented in integrated form. Thus, for example in the case of VDSL transmission systems, the resistance of the simulation device can be between about 1 kΩ and about 4 kΩ, whereas the resistance of the simulated part of the bridge branch, for example, is just about 20 Ω.

This embodiment constitutes a good compromise between adaptability for different load or line impedances (in the present embodiment, shown by Z1 or Z2), low signal power in the simulated path Z3 to Z5, and an input path with minimum noise for the input signal.

Figure 2:
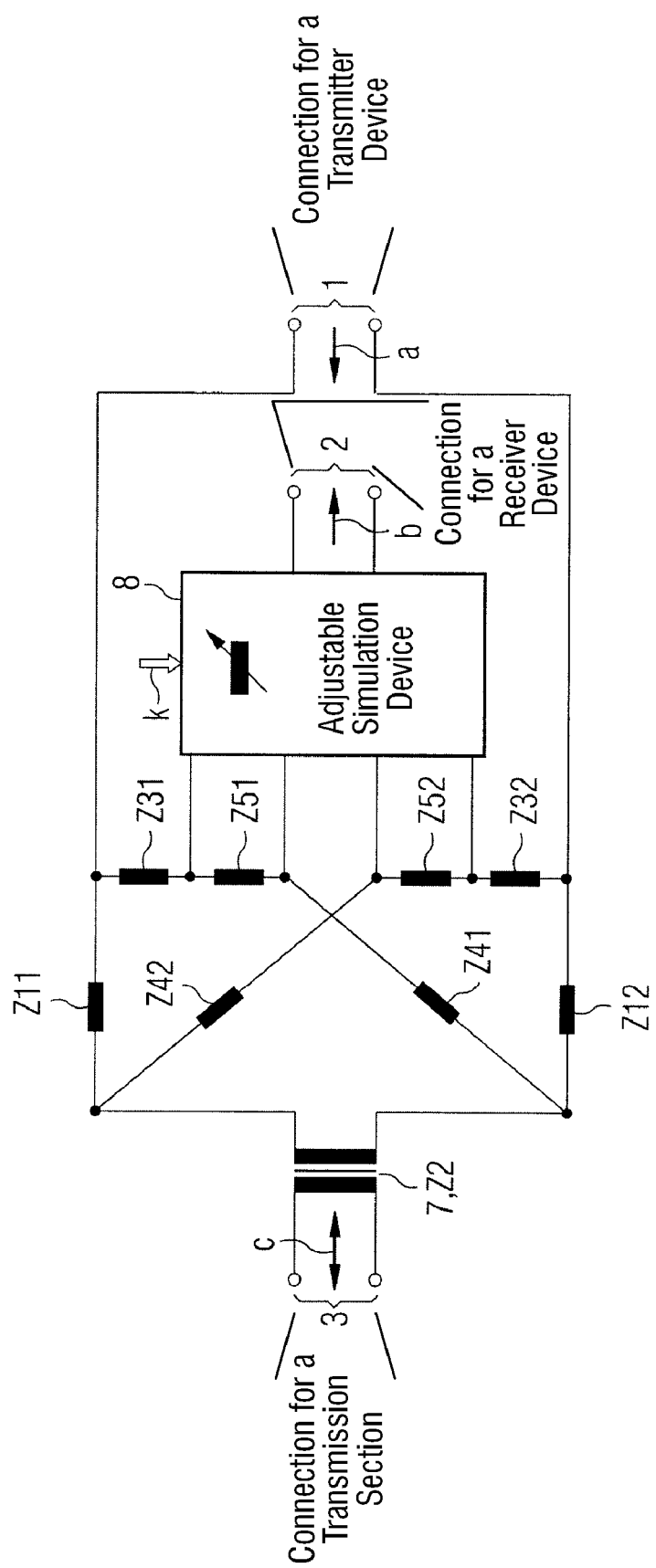
FIG. 2 shows a second embodiment of a bridge circuit according to the invention.

A further embodiment according to the invention is shown in FIG. 2. This shows in principle a doubling of the bridge circuit shown in FIG. 1.

In the same way as the case shown above, a transmission and reception signal c is coupled with a double bridge circuit arrangement via a connection 3 for a transmission line and via a transmitter 7. Supplied to this double bridge circuit arrangement, as in FIG. 1, is a transmission signal a via a connection 1 for a transmitter device and a reception signal b is tapped at a connection 2 for a receiver device.

A first bridge branch of a first bridge circuit of the double bridge circuit arrangement is formed by an impedance Z11 and an impedance Z2, and a second bridge branch of this first bridge circuit is formed by impedances Z31, Z41 and Z51. Similarly a first bridge branch of a second bridge circuit of the double bridge circuit arrangement is formed by an impedance Z12 and impedance Z2, and a second bridge branch of this second bridge circuit is formed by impedances Z32, Z42 and Z52.

Impedances Z11 or Z12 can for example, in a similar manner to the impedance Z1 shown in FIG. 1, represent loads on a communication device comprising a bridge circuit. The impedance Z2 represents the impedance of a winding of the transmitter plus a line impedance of the transmission line transformed according to the transfer ratio. A variable simulation device 8 taps accordingly at impedances Z51 and Z52; in this embodiment both poles of connection 2 for a receiver device are tapped at simulation device 8. The simulation device 8 which simulates impedances Z51 and Z52, as shown by a balancing parameter k, can be adapted so that the echo is minimized. In this case, the balancing parameter k is two-dimensional, k=(k1, k2), where k1 indicates a part of the two-dimensional balancing parameter provided to balance the first bridge circuit and k2 a part provided to balance the second bridge circuit k, and both k1 and k2 lie in the closed interval between 0 and 1. The echo is optimally suppressed when both equations 3.1 and 3.2 corresponding to equation 2 are fulfilled.

$$\frac{Z11}{Z2} = \frac{Z31 + k1 \cdot Z51}{Z41 + (1-k1) \cdot Z51} \quad (3.1)$$

$$\frac{Z12}{Z2} = \frac{Z32 + k2 \cdot Z52}{Z42 + (1-k2) \cdot Z52} \quad (3.2)$$

By introducing impedances Z51 and Z52, again a reduction in signal level is achieved in the simulation device 8, which can therefore be implemented in the form of an integrated and programmable circuit. The balancing parameter k can be determined in a similar manner to the embodiment in FIG. 1 described above.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An echo suppression device comprising:
   a bridge circuit that includes a bridge branch having an impedance and a balancing circuit having another impedance higher than said impedance of said bridge branch, said balancing circuit connected in parallel to a portion of said bridge branch and being tunable to balance said bridge circuit;
   said balancing circuit comprising an output to provide at least a portion of an echo-suppressed reception signal.

2. The balancing circuit of claim 1, wherein said balancing circuit is an integrated circuit.

3. The balancing circuit of claim 1, wherein said balancing circuit is connected in parallel to a portion of a further bridge branch of said bridge circuit.

4. The balancing circuit of claim 1, wherein said impedance of said bridge branch comprises a first impedance, a second impedance and a third impedance connected in series, wherein said balancing circuit is connected in parallel to said second impedance.

5. A bridge circuit comprising:
   at least a first bridge branch;
   a second bridge branch; and,
   a programmable impedance array connected in parallel with a portion of said second bridge branch.

6. The programmable impedance array of claim 5, comprising an output to provide an output signal of said bridge circuit.

7. The programmable impedance array of claim 5, wherein the programmable impedance array is integrated in an integrated circuit.

8. The programmable impedance array of claim 5, wherein said programmable impedance array is programmable to balance the bridge circuit.

9. An echo suppression circuit comprising:
   a bridge circuit, said bridge circuit including:
      a bridge branch having a first node and a second node different from said first node;
      a circuit portion connected with said bridge branch at said first node and at said second node, said circuit portion being configured to output an output voltage between a voltage at said first node and a voltage at said second node depending on an adjustment parameter.

10. The echo suppression circuit of claim 9, wherein said bridge circuit further comprises a further bridge branch having a third node and a fourth node, said circuit portion being further connected with said further bridge branch at said third node and at said fourth node, said circuit portion being further configured to output a further output voltage between a voltage at said third node and a voltage at said fourth node depending on a further adjustment parameter.

11. The echo suppression circuit of claim 9, wherein said circuit portion includes an impedance and said bridge branch includes another impedance between said first node and said second node, said impedance of said circuit portion being higher than said another impedance of said bridge branch.

12. The circuit portion of claim 9, wherein said circuit portion comprises an integrated circuit.

13. The circuit portion of claim 9, wherein said output voltage is at least part of an output signal of said bridge circuit.

14. The circuit portion of claim 9, wherein said another impedance of said bridge branch comprises a first impedance, a second impedance and a third impedance connected in series, wherein said first node is located between said first impedance and said second impedance, and said second node is located between said second impedance and said third impedance.

15. A bridge circuit comprising:
   a first bridge branch;
   a second bridge branch; and,
   a balancing circuit connected in parallel to a portion of said second bridge branch, said balancing circuit being tunable to balance said first bridge branch and said second bridge branch, said balancing circuit comprising an output to provide at least a portion of an output signal of said bridge circuit.

16. The bridge circuit of claim 15, wherein said first bridge branch comprises an impedance of at least one element of the group comprising: a transmission line; a transmitter coupling said transmission line to said bridge circuit; and a communication device comprising the bridge circuit.

17. The bridge circuit of claim 15, wherein said second bridge branch further comprises another impedance, said another impedance including:
   a first impedance, a second impedance, and a third impedance;
   a first node between said first impedance and said second impedance; and,
   a second node between said second impedance and said third impedance;
   wherein said balancing circuit is connected to said first node and to said second node.

18. The bridge circuit of claim 15, wherein said output signal is configured to suppress an echo in a communication device.

19. The bridge circuit of claim 15, wherein said balancing circuit comprises a programmable impedance array.

20. The bridge circuit of claim 15, further comprising:
   a third bridge branch;
   a fourth bridge branch; and
   said balancing circuit connected in parallel to a portion of said fourth bridge branch, said balancing circuit being tunable to balance said third bridge branch and said fourth bridge branch, said balancing circuit comprising a further output to provide a further portion of said output signal of said bridge circuit.

21. The bridge circuit of claim 15, wherein said balancing circuit comprises an integrated circuit.

22. The bridge circuit of claim 17, wherein said balancing circuit includes a balancing circuit impedance that is higher than said another impedance of said second bridge branch.

23. A method for balancing a bridge circuit comprising:
   providing a first bridge branch;
   providing a second bridge branch;
   providing a balancing circuit connected in parallel to a portion of said second bridge branch;
   tuning said balancing circuit to generate a balanced output signal; and,
   tapping said balanced output signal at said balancing circuit.

24. The method of claim 23, wherein said balancing circuit comprises a programmable impedance array, and wherein tuning said balancing circuit further comprises programming said programmable impedance array.

* * * * *